United States Patent
Lee et al.

(10) Patent No.: US 12,435,310 B2
(45) Date of Patent: Oct. 7, 2025

(54) EXPANSION CULTURE METHOD FOR HUMAN-DERIVED NATURAL KILLER CELLS BY USING HDAC INHIBITOR

(71) Applicant: KOREA UNIVERSITY RESEARCH AND BUSINESS FOUNDATION, Seoul (KR)

(72) Inventors: Kyung-Mi Lee, Seoul (KR); Seon Ah Lim, Seoul (KR); Cassian Yee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 1014 days.

(21) Appl. No.: 17/055,678

(22) PCT Filed: May 13, 2019

(86) PCT No.: PCT/KR2019/005721
§ 371 (c)(1),
(2) Date: Nov. 16, 2020

(87) PCT Pub. No.: WO2019/221463
PCT Pub. Date: Nov. 21, 2019

(65) Prior Publication Data
US 2021/0198627 A1    Jul. 1, 2021

(30) Foreign Application Priority Data
May 16, 2018    (KR) .................. 10-2018-0055858

(51) Int. Cl.
*C12N 5/0783* (2010.01)

(52) U.S. Cl.
CPC .... *C12N 5/0646* (2013.01); *C12N 2501/2302* (2013.01); *C12N 2501/999* (2013.01)

(58) Field of Classification Search
None
See application file for complete search history.

(56) References Cited

U.S. PATENT DOCUMENTS

| | | | | |
|---|---|---|---|---|
| 2012/0258085 A1* | 10/2012 | Alici | ..................... | C12N 5/0646 435/372 |
| 2015/0023937 A1* | 1/2015 | Vera Valdes | ......... | A61K 38/177 435/375 |
| 2015/0152387 A1* | 6/2015 | Lee | ..................... | C12N 5/0646 435/372.3 |
| 2018/0021378 A1* | 1/2018 | Kang | ..................... | A61P 29/00 424/135.1 |
| 2021/0189337 A1* | 6/2021 | Yee | ..................... | C12N 5/0636 |

FOREIGN PATENT DOCUMENTS

| JP | 2016-525124 A | * | 8/2016 | ............. | A61K 38/17 |
|---|---|---|---|---|---|
| KR | 10-2013-0084465 A | | 7/2013 | | |
| KR | 10-2016-0063114 A | | 6/2016 | | |
| KR | 10-2017-0000798 A | | 1/2017 | | |
| WO | WO-2010110734 A1 | * | 9/2010 | ............. | A61P 35/00 |

OTHER PUBLICATIONS

Ida, Hiroaki et al., "Activation-induced NK cell death triggered by CD2 stimulation." *European journal of immunology*, 28, 4, 1998 (pp. 1292-1300).
Ogbomo, Henry, et al., "Histone deacetylase inhibitors suppress natural killer cell cytolytic activity." *FEBS letters*, 581, 7, 2007 (pp. 1317-1322).
Senese, Silvia, et al., "Role for Histone Deacetylase 1 in Human Tumor Cell Proliferation." *Molecular and cellular biology*, vol. 27, No. 13, Jul. 2007 (pp. 4784-4795).
Tao, Ran, et al., "Deacetylase inhibition promotes the generation and function of regulatory T cells." *Nature medicine*, 13, 11, 2007 (pp. 1299-1307).
Smith, Catharine L. "A shifting paradigm: histone deacetylases and transcriptional activation." *Bioessays*, 30, 1, 2008 (pp. 15-24).
López-Soto, Alejandro, et al., "HDAC3 represses the expression of NKG2D ligands ULBPs in epithelial tumour cells: potential implications for the immunosurveillance of cancer." *Oncogene*, 28, 25, 2009 (pp. 2370-2382).
Vo, Dan D., et al., "Enhanced Antitumor Activity Induced by Adoptive T-Cell Transfer and Adjunctive Use of the Histone Deacetylase Inhibitor LAQ824." *Cancer research*, 69, 22, 2009 (pp. 8693-8699).
Schmudde, Mareike, et al., "Histone deacetylase inhibitors prevent activation of tumour-reactive NK cells and T cells but do not interfere with their cytolytic effector functions." *Cancer letters*, 295, 2, 2010 (pp. 173-181).
Wang, Yun, et al., "A Clinical Study of Cervical Dysplasia in Long-Term Survivors of Allogeneic Stem Cell Transplantation." *Biology of Blood and Marrow Transplantation*, 18, 5, 2012 (pp. 747-753).
Rosborough, Brian R., et al. "Histone deacetylase inhibition facilitates GM-CSF-mediated expansion of myeloid-derived suppressor cells in vitro and in vivo." *Journal of leukocyte biology*, vol. 91, 5, May 2012 (pp. 701-709).
West, Alison C., et al., "An intact immune system is required for the anticancer activities of histone deacetylase inhibitors." *Cancer research*, 73, 24, 2013 (pp. 7265-7276).

(Continued)

*Primary Examiner* — Nghi V Nguyen
(74) *Attorney, Agent, or Firm* — NSIP Law

(57) ABSTRACT

The present invention relates to an expansion culture method for natural killer cells and, more particularly, to an expansion culture method for natural killer cells, wherein the cultured natural killer cells are treated with an HDAC inhibitor. According to the present invention, when natural killer cells are subjected to in vitro expansion culture, the cells can be restrained from undergoing cell death, resulting in a remarkable improvement in the viability and production yield of the cells. Thus, natural killer cells, which are needed for cell therapy, such as cancer therapy, etc., can be obtained effectively.

1 Claim, 4 Drawing Sheets

(56) References Cited

OTHER PUBLICATIONS

Siddiquey, Mohammed NA, et al. "Anti-tumor effects of suberoylanilide hydroxamic acid on Epstein-Barr virus-associated T cell and natural killer cell lymphoma", *Cancer science*, 105, 6, 2014 (pp. 713-722).
Zhu, Shiguo, et al., "The narrow-spectrum HDAC inhibitor entinostat enhances NKG2D expression without NK cell toxicity, leading to enhanced recognition of cancer cells." *Pharmaceutical research*, 32, 3, 2015 (pp. 779-792).
Schenk, Alexander et al., "Natural Killer Cells—An Epigenetic Perspective of Development and Regulation." *International Journal of Molecular Sciences*, 17, 3, 2016 (pp. 1-10).
Kiany, Simin, et al., "Effect of entinostat on NK cell-mediated cytotoxicity against osteosarcoma cells and osteosarcoma lung metastasis." *Oncoimmunology*, vol. 6, No. 8, 2017 (13 pages in English).
International Search Report issued on Aug. 19, 2019 in counterpart International Patent Application No. PCT/KR2019/005721 (2 pages in English and 2 pages in Korean).
Korean Notice of Allowance issued on Jan. 16, 2020 in counterpart Korean Patent Application No. 10-2018-0055858 ( 2 pages in Korean).
Cho, Duck et at., "Expansion and Activation of Natural Killer Cells for Cancer Immunotherapy." *Korean J Lab Med*. 2009 (10 pages in English).
Lim, Seon Ah et al., "Ex Vivo Expansion of Highly Cytotoxic Human NK Cells by Cocultivation with Irradiated Tumor Cells for Adoptive Immunotherapy." *Cancer Research 2013*, 73(8) Apr. 15, 2013 (pp. 2598-2607).
Schotteri, Sonja et al., "Modulation of Immune Responses by Histone Deacetylase Inhibitors." *Critical Reviews in Oncogenesis*, vol. 20(1-2) 2015 (pp. 139-154).
Becker, Petra et al., "Selection and expansion of natural killer cells for NK cell-based immunotherapy." *Cancer Immunology, Immunotherapy* (2016) 65, Jan. 25, 2016 (pp. 477-484).
Extended European Search Report issued on Jan. 7, 2022, in counterpart European Patent Application No. 19802523.1 (8 pages in English).

* cited by examiner

A)

B)

C)

A)

B)

ID BY USING HDAC INHIBITOR

EXPANSION CULTURE METHOD FOR HUMAN-DERIVED NATURAL KILLER CELLS BY USING HDAC INHIBITOR

CROSS REFERENCE TO RELATED APPLICATIONS

This application is a U.S. National Stage Application of International Application No. PCT/KR2019/005721, filed on May 13, 2019, which claims the benefit under 35 USC 119 (a) and 365(b) of Korean Patent Application No. 10-2018-0055858, filed on May 16, 2018, in the Korean Intellectual Property Office, the entire disclosure of which is incorporated herein by reference for all purposes.

TECHNICAL FIELD

The present invention relates to a culture method for expansion of natural killer cells, and more particularly to a culture method for expansion of natural killer cells, the method comprising treating cultured natural killer cells with an HDAC inhibitor.

BACKGROUND ART

The human immune system is regulated by complex mechanisms, and abnormalities in the immune system may lead to imbalances in the immune system, causing various intractable diseases such as cancer. Therefore, attention has been paid on the development of immune cell therapy, which is a method of treating immune-related diseases by resolving imbalances in the immune system, restoring the immune system to a normal state and strengthening the immune system.

The human immune system is divided into an innate immune system and an acquired immune system. The innate immune system is composed of cells that first attack foreign antigens entering the human body. Representative cells include natural killer cells, which have attracted attention as cell therapy products because these natural killer cells have advantages in that they can kill various types of cancer cells and recognize cancer cells regardless of the presence or absence of antigens.

In order to use immune cells as cell therapy products, it is particularly necessary to obtain a large number of cells and to enable the cells to have high anticancer activity. In addition, when the obtained immune cells are injected into the patient's body, they should effectively survive in the body.

However, when immune cells cultured ex vivo are injected into the body, their activity is not maintained for a long time. In particular, when cells are excessively expanded, they are inevitably prone to cell death or cell aging. Therefore, only when the cultured immune cells remain stable in the patient's body for a long time, these cells can effectively act as cell therapy products.

Epigenetics is a phenomenon in which gene expression is regulated while the nucleotide sequence of DNA does not change. The structural change of chromatin affects "chromatin remodeling" and gene expression is regulated. This field has recently attracted attention and has been reported to play an important role in the activation and deactivation of immune cells (Schenk et al., *Int J Mol Sci*, 2016).

Histone deacetylases (HDACs) are enzymes that are involved in chromatin remodeling. It is known that HDACs mainly affect the transcription process, and it has been reported that overacetylation of histones leads to the inhibition of transcription (Smith et al., *BioEssay*, 30:15-24, 2007). In addition HDACs are known to regulate gene expression by targeting many non-histone protein substrates, in addition to modifying histones. Thus, when HDACs are inhibited, the chromatin structure opens up, so that various transcriptional regulatory factors may bind thereto.

It has been previously reported that, when natural killer cells (NK cells) cultured with IL-2 are treated with an anti-CD2 antibody, chromatin is condensed and cell death is induced (Ida et al., *Eur J Immunol*, 28:1292-1300, 1998). Thus, as NK cells are activated by external stimuli, the chromatin structure is closed by HDACs, so that transcription factors cannot bind thereto, resulting in inhibition of cell proliferation and induction of cell death. Accordingly, efforts have been made to develop a method of inhibiting cell death by inhibiting HDACs to induce structural changes in chromatin so that cell survival-related transcription factors can bind to the chromatin.

Regarding HDAC inhibitors, it has been reported that histone deacetylase inhibitors (HDACi) induce differentiation, cell cycle arrest, cell death, autophagy and necrosis in various cancer cell lines (Senese et al., *Molecular and Cellular Biology*, 27:4784-4795, 2007). HDAC inhibitors are known to promote cancer cell apoptosis by enhancing the DNA damage response of cancer cells and inhibiting DNA repair, and this mechanism does not occur in normal cells. Therefore, it was thought that HDAC inhibitors would show differential effects in cancer and normal cells.

In relation to immune cells, it has been reported that, when cancer cells are treated with HDAC inhibitors, the expression of NKG2D ligand is increased, so that NK cells readily recognize cancer cells (Lopez-Soto et al., *Oncogene*, 28:2370-2382, 2009), indicating that this treatment has an anticancer effect. In addition, it has been reported that treatment with HDAC inhibitors increases immunogenic cell death (West et al., *Cancer Research*, 7:7265-7276, 2013).

It has been reported that treatment of NK cells with the HDAC inhibitor valproic acid decreases the proliferation and cancer cell killing ability of the NK cells (Ogbomo et al., *FEBS Letters*, 581:1317-1322, 2007). In addition, it has been reported that, when activated NK cells are treated with vorinostat, there is no change in the cancer cell killing ability of the NK cells (Wang et al., *Biol Blood Marrow Transplant*, 18:747-753, 2012).

In the case of T cells, it has been reported that, when CD4 T cells are treated with an inhibitor, the cell viability thereof decreases and the proliferation and cytokine secretion thereof are inhibited (Schmudde et al., *Cancer Lett*, 295: 173-181, 2010). In addition, it has been reported that, when CD8 T cells are treated with an inhibitor, the memory function thereof increases (Vo et al., *Cancer Research*, 69:8693-9699, 2009).

In contrast, it has been reported that, in the case of Treg cells which are regulatory immune cells, Foxp3 expression and immune suppression ability are increased (Tao et al., *Nature Med*, 13:1299-1307, 2007), and that MDSC differentiation is enhanced (Rosborough et al., *J Leukoc Biol*, 91:701-709, 2012).

Accordingly, the present inventors have made extensive efforts to develop a method of effectively increasing the viability and yield of immune cells during expansion thereof, and as a result, have found that, when NK cells are treated with an HDAC inhibitor during ex vivo expansion culture of the NK cells, expansion of the NK cells is enhanced, so that the viability and yield of the cells significantly increase, thereby completing the present invention.

SUMMARY OF THE INVENTION

An object of the present invention is to provide a culture method of enhancing expansion of natural killer cells during ex vivo culture.

To achieve the above object, the present invention provides a culture method for expansion of natural killer cells, the method comprising: (a) culturing natural killer cells for 1 to 15 days; (b) treating the cultured natural killer cells with an HDAC inhibitor; and (c) additionally culturing the treated natural killer cells.

BRIEF DESCRIPTION OF DRAWINGS

FIG. 1(A) shows a method of treating natural killer cells with an HDAC inhibitor during expansion culture thereof, FIG. 1(B) shows a growth curve of the natural killer cells and a change in the distribution of the natural killer cells after treatment with the HDAC inhibitor, and FIG. 1(C) shows a growth curve of the NK cells cultured after the HDAC inhibitor was added on day 0 or day 10.

FIG. 2(A) shows a method of treating natural killer cells with an HDAC inhibitor during expansion culture thereof, and growth curves of the treated natural killer cells, and FIG. 2(B) shows growth curves of natural killer cells treated with various concentrations of an HDAC inhibitor during expansion culture of the natural killer cells.

DETAILED DESCRIPTION AND PREFERRED EMBODIMENTS OF THE INVENTION

Figure 1:
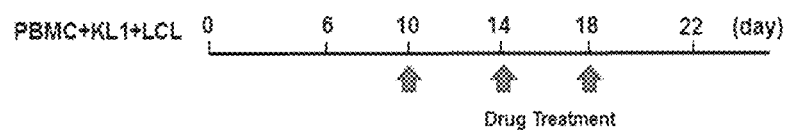
FIG. 1 shows the results of analyzing the effect of an HDAC inhibitor on the growth of natural killer cells.
Figure 1:
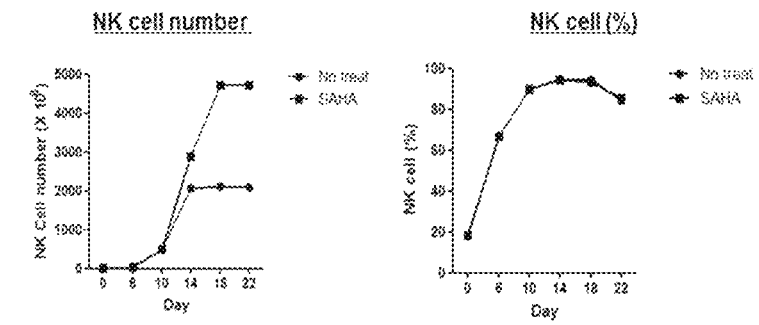
Figure 1:
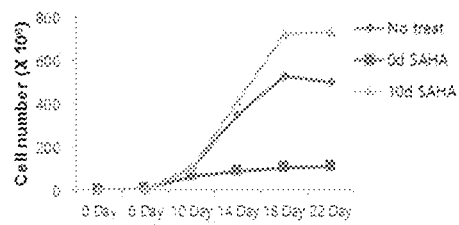

Unless otherwise defined, all technical and scientific terms used in the present specification have the same meanings as commonly understood by those skilled in the art to which the present disclosure pertains. In general, the nomenclature used in the present specification is well known and commonly used in the art.

In the present invention, a method of enhancing the yield of natural killer cells (NK cells) using a histone deacetylase (HDAC) inhibitor during ex vivo expansion culture of the NK cells was developed. In addition, it was found that, when NK cells are treated with an HDAC inhibitor at an initial stage, proliferation of the NK cells is inhibited in the same manner as in the previous report, but when proliferating NK cells are treated with an HDAC inhibitor, expansion of the NK cells is enhanced compared to that of a control group not treated with the HDAC inhibitor, unlike the previous report. This fact suggests that treatment with the HDAC inhibitor makes it possible to obtain a larger number of natural killer cells by inhibiting apoptosis. That is, it was newly found that, since HDAC activity is important in the proliferation of resting natural killer cells, unlike proliferating cells, treatment of proliferating cells with an HDAC inhibitor is key to increasing the number of cells. In addition, it was found that natural killer cells treated with the HDAC inhibitor may maintain the cancer cell killing ability thereof regardless of treatment or non-treatment with the HDAC inhibitor.

Therefore, the present invention is directed to a culture method for expansion of natural killer cells, the method comprising: (a) culturing natural killer cells for 5 to 15 days; (b) treating the cultured natural killer cells with an HDAC inhibitor; and (c) additionally culturing the treated natural killer cells.

In the present invention, the HDAC inhibitor may be selected from the group consisting of SAHA, valproic acid, vorinostat, entinostat, and romidepsin. In the present invention, the HDAC inhibitor is preferably used at a concentration of 20 to 500 nM, more preferably 31.25 to 125 nM, even more preferably 50 to 80 nM.

In the present invention, the natural killer cells are treated with the HDAC inhibitor after 5 to 15 days of culture, preferably 6 to 12 days of culture, more preferably 7 to 10 days of culture.

In the present invention, the natural killer cells may be first treated with the HDAC inhibitor on day 6 of culture, and then additionally treated with the HDAC inhibitor 3 to 4 times at 4 day-intervals.

In the present invention, the culturing in step (c) may be performed in medium supplemented with IL-2.

In the present invention, the natural killer cells may be co-cultured with feeder cells such as Jurkat (KL-1) cells, EBV-LCL cells or K562 cells.

In one example of the present invention, it was confirmed that, when human peripheral blood mononuclear cells were isolated, co-cultured with Jurkat cells and EBV-LCL cells for 10 days, and then treated with SAHA as an HDAC inhibitor, the number of the natural killer cells increased compared to that in a conventional culture method, and treatment with the inhibitor did not change the proliferation of the cells, and inhibited apoptosis of the natural killer cells, and also treatment with the inhibitor did not change the cancer cell killing ability of the natural killer cells. In addition, treatment with the inhibitor did not change interferon-gamma secretion of the cells Therefore, the method of the present invention is a method which does not change the function of natural killer cells, but makes it possible to obtain a larger number of cells by inhibiting apoptosis, compared to a conventional method.

In another example of the present invention, it was confirmed that, when natural killer cells were treated with SAHA as an HDAC inhibitor at an initial stage without being cultured, no increase in the number of cells was observed.

Hereinafter, the present invention will be described in more detail with reference to examples. It will be obvious to those skilled in the art that these examples serve merely to illustrate the present invention, and the scope of the present invention is not construed as being limited by these examples.

Example 1: Increase in Cell Number by HDAC Inhibitor Treatment During Culture of Natural Killer Cells Human blood was collected, and then centrifuged using Ficoll (Ficoll-Paque™ PLUS, GE Healthcare) at 2500 rpm for 30 minutes, and peripheral blood mononuclear cells were isolated from the buffy coat. Thereafter, the isolated cells were co-cultured with the Jurkat cell line (Korea Cell Line Bank) and EBV-LCL cell line (Korea Cell Line Bank) (each cell line was irradiated with 100 Gy) at a peripheral blood mononuclear cell:Jurkat cell:EBV-LCL cell ratio of 1:0.5: 0.5 in hRPMI medium (RPMI1640 medium (Corning) containing 10% FBS and 1% penicillin/streptomycin) in the presence of 500 U/ml of IL-2. During culture, the medium was replaced with hRPMI medium containing 500 U/ml of IL-2 once every 3 to 4 days.

In order to confirm the effect of an HDAC inhibitor on natural killer cells, the natural killer cells cultured for 6 days under the above-described conditions were treated with 125 nM of an HDAC inhibitor (SAHA, Sigma Aldrich, USA) once every 4 days, and the number of the cells was counted (FIG. 1A). At this time, the number of the cells was counted using a hematocytometer once every 4 days while the cells were further cultured for about 12 days, and during culture, the medium was replaced with hRPMI medium containing 500 U/ml of IL-2.

As a result, as shown in FIG. 1B, it was confirmed that the number of cells in the experimental group treated with the HDAC inhibitor SAHA was more than double that in the control group not treated with the HDAC inhibitor.

In addition, FIG. 1C shows a growth curve of the natural killer cells cultured after the HDAC inhibitor was added on day 0 or day 10 during culture of the natural killer cells. As can be seen therein, the proliferation of the NK cells decreased when the NK cells were treated with the HDAC inhibitor on day 0 of culture compared to when the NK cells were treated with the HDAC inhibitor on day 10 of culture.

Figure 2:
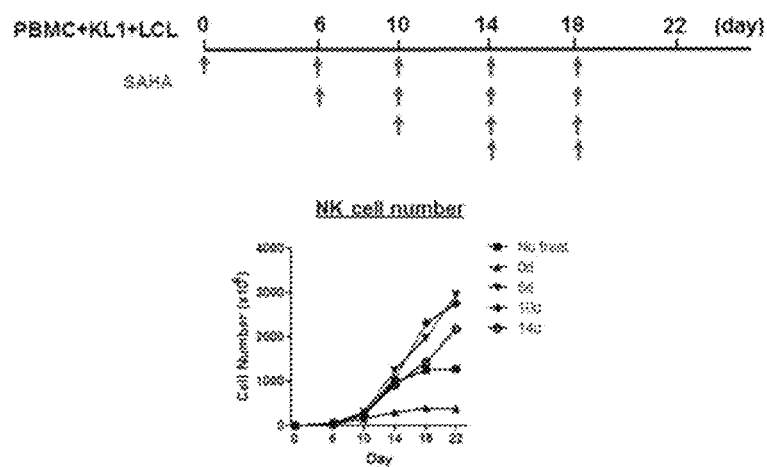
FIG. 2 shows the results of analyzing the effect of an HDAC inhibitor on the growth of natural killer cells.
Figure 2:
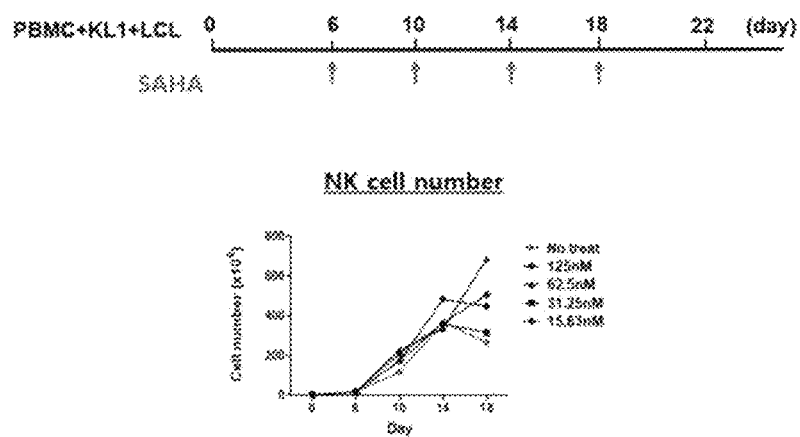

In addition, as can be seen in FIG. 2A, the number of cells in the experimental group treated with SAHA from co-culture day 6 was measured to be the highest. As shown in FIG. 2B, it was confirmed that the proliferation of the NK cells was the highest when the NK cells were treated with SAHA at a concentration of 62.5 nM (FIG. 2B). Thus, the timing and amount of treatment were optimized.

Example 2: Measurement of Cell Apoptosis and Proliferation by HDAC Inhibitor Treatment During Culture of Natural Killer Cells In the same manner as in Example 1, natural killer cells expanded ex vivo for 10 days were treated with an HDAC inhibitor and further cultured for 8 days. After harvesting the cells, $5 \times 10^5$ cells were obtained and apoptosis and proliferation thereof were measured using a flow cytometer.

To measure apoptosis, cells were harvested and stained with annexin V (2.5 µl) and 7AAD (2 µl) for 15 minutes, and then the proportion of the cells stained with annexin V/7AAD was analyzed using FACS Cantoll (BD). To measure cell proliferation, PerCP-labeled CD3 mAb (Biolgend Cat No. 344814 clone SK7) and APC-labeled CD56 mAb (Biolegend Cat No. 362504 clone 5.1H11) were added to the cells and allowed to react at 4° C. for 20 minutes. For intracellular FACS, the cells were washed with FACS buffer, and analyzed by staining Ki67 in the cell nucleus with the eBioscience Foxp3/transcription factor staining buffer set (eBioscience Cat No. 00-5523-00).

Figure 3:
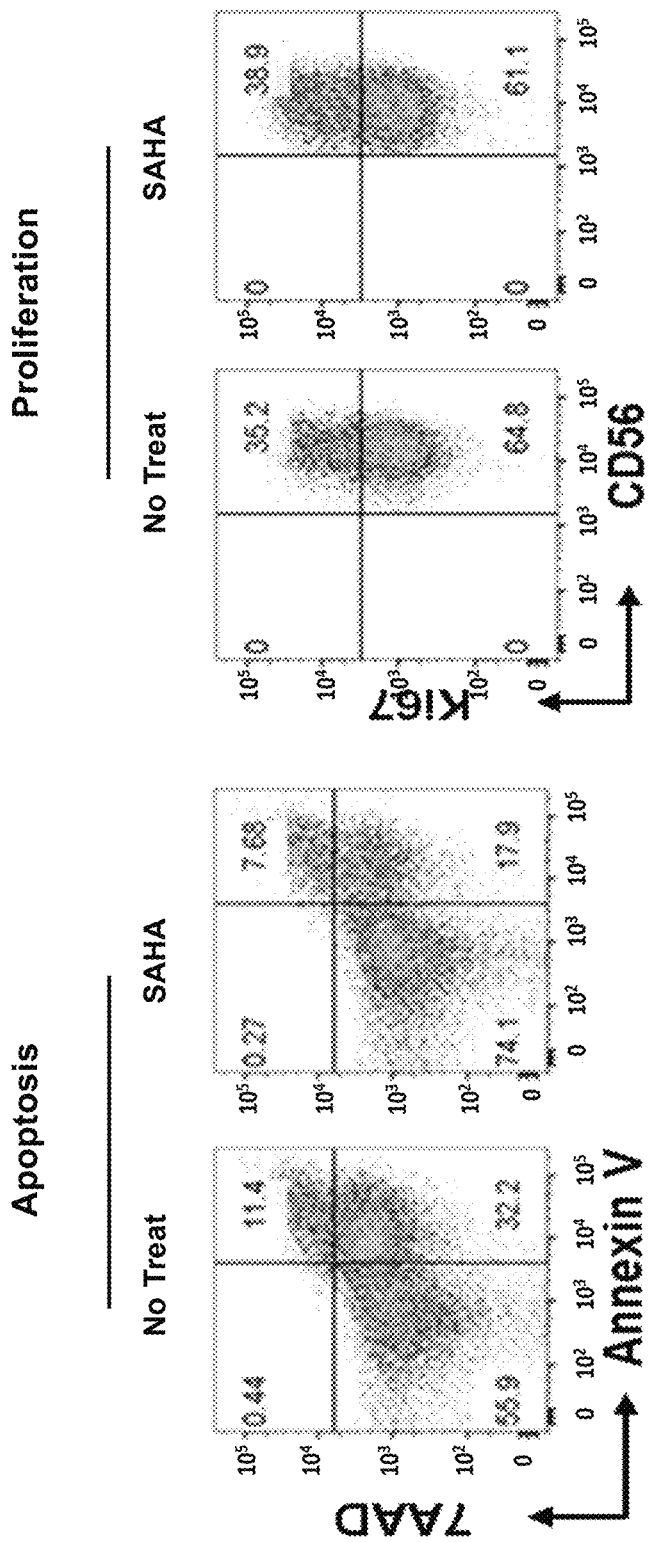
FIG. 3 shows the results of analyzing the effect of an HDAC inhibitor on the growth of natural killer cells, and shows apoptosis and proliferation of the natural killer cells treated or not treated with the HDAC inhibitor.

As a result, as shown in FIG. 3, it could be confirmed that, when the natural killer cells were treated with the HDAC inhibitor, there was no significant change in the proliferation of the natural killer cells, and apoptosis of the natural killer cells was inhibited by treatment of HDAC inhibitor.

Example 3: Confirmation of Changes in Cancer Cell Killing Ability of Natural Killer Cells by Treatment of Hdac Inhibitor During Culture of Natural Killer Cells In order to examine whether the cancer cell killing ability of the natural killer cells expanded ex vivo by the method of Example 1 changes, K562 (Korea Cell Line Bank) and A375 (Korea Cell Line Bank) cells were prepared as target cancer cells, labeled with chromium for 1 hour, mixed with natural killer cells at a ratio of 1:1, and then co-cultured 37° C. After 4 hours, the supernatant was taken and the isotope value thereof was analyzed using a gamma counter.

2.5 µl of FITC-labeled anti-CD107a mAb was added to the cells, and Golgi stop (BD Pharmingen) was added, followed by culture at 37° C. for 5 hours. After completion of culture, PerCPp-labeled CD3 mAb (Biolgend Cat No. 344814 clone SK7) and APC-labeled CD56mAb (Biolegend Cat No. 362504 clone 5.1H11) were added to the cells and allowed to react at 4° C. for 20 minutes. For intracellular FACS, the cells were washed with FACS buffer, fixed, permeabilized using a BD Cytoperm/Cytofix kit (BD Pharmingen, San Diego, CA), stained with PE-labeled IFN-g mAb, and then analyzed by flow cytometry. As a positive control, natural killer cells treated with PMA/ ionomycin were used.

Figure 4:
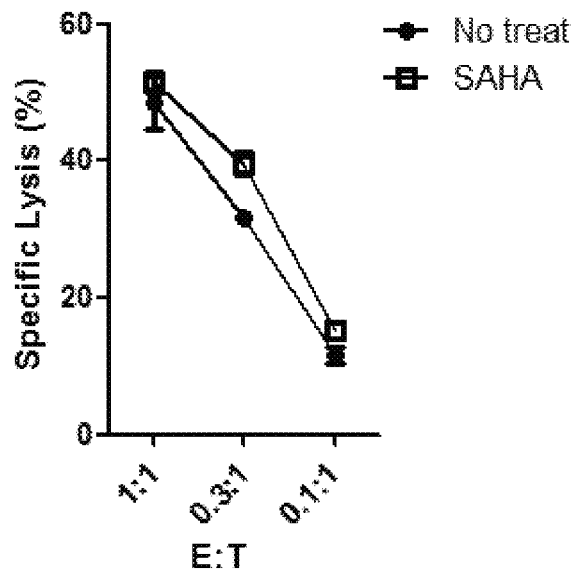
FIG. 4(A) shows the results of analyzing the cancer cell killing ability of natural killer cells after treatment with an HDAC inhibitor.
FIG. 4(B) shows the results of analyzing the expression of CD107a (a measure of cytotoxic ability) and secretion of IFN-g (cytokine) in the cultured natural killer cells treated or not treated with the HDAC inhibitor.
Figure 4:
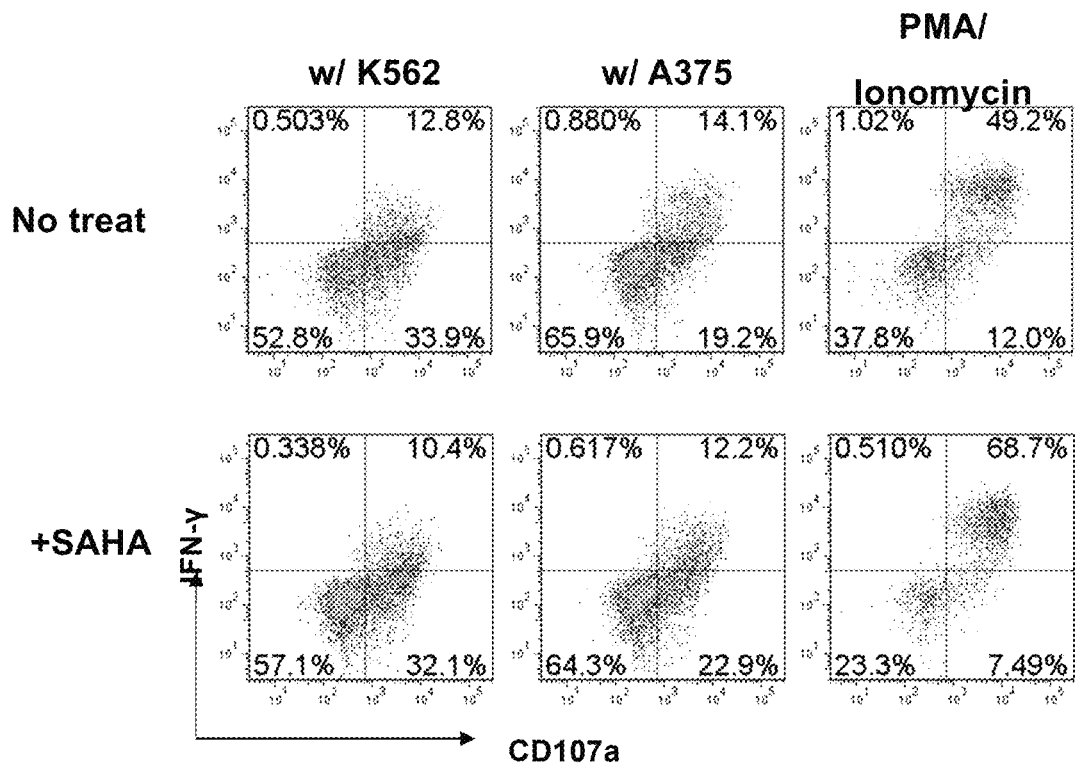

As a result, as shown in FIG. 4, it could be seen found that the cancer cell killing ability of the natural killer cell group treated with the HDAC inhibitor was similar to that of the untreated control group. FIG. 4B shows the results of analyzing the expression of CD107a (a measure of cytotoxic ability) and secretion of IFN-g (cytokine) in the cultured natural killer cells treated or not treated with the HDAC inhibitor. As can be seen therein, after treatment with the HDAC inhibitor, there was no change in the function of the natural killer cells.

Industrial Applicability

According to the present invention, natural killer cells necessary for cell therapy such as cancer therapy may be efficiently obtained by inhibiting apoptosis of natural killer cells during ex vivo expansion culture thereof to significantly increase the viability and yield of the cells.

Although the present invention has been described in detail with reference to specific features, it will be apparent to those skilled in the art that this description is only of a preferred embodiment thereof, and does not limit the scope of the present invention. Thus, the substantial scope of the present invention will be defined by the appended claims and equivalents thereto.

The invention claimed is:

1. A culture method for expansion of natural killer cells, the method consisting of:
(a) co-culturing natural killer cells with Jurkat cell line from Korea Cell Line Bank and EBV-LCL cell line from Korea Cell Line Bank, where each of the Jurkat cell line and the EBV-LCL cell line was irradiated with 100 Gy and at the natural killer cell lines: the Jurkat cell lines: the EBV-LCL cell lines ratio of 1:0.5:0.5 in hRPMI medium containing 10% FBS and 1% penicillin/streptomycin in presence of 500 U/ml of IL-2, for 5 to 15 days, and during the co-culturing, replacing the hRPMI medium with another hRPMI medium containing 500 U/ml of IL-2 once every 3 to 4 days;
(b) treating the cultured natural killer cells with an HDAC (Histone deacetylase) inhibitor; and
(c) additionally culturing the treated natural killer cells, wherein the natural killer cells are first treated with the HDAC inhibitor on day 6 of co-culturing, and then additionally treated with the HDAC inhibitor 1 to 3 times at intervals of 2 to 4 days, and wherein the HDAC inhibitor is Suberoylanilide-hydroxamic acid (SAHA) used at a concentration of 62.5 nM.

\* \* \* \* \*